(12) United States Patent
Miksa et al.

(10) Patent No.: US 8,571,354 B2
(45) Date of Patent: Oct. 29, 2013

(54) METHOD OF AND ARRANGEMENT FOR BLURRING AN IMAGE

(75) Inventors: Krzysztof Miksa, Lodz (PL); Marcin Michal Kmiecik, Lodz (PL)

(73) Assignee: Tomtom Global Content B.V., Eindhoven (NL)

( * ) Notice: Subject to any disclaimer, the term of this patent is extended or adjusted under 35 U.S.C. 154(b) by 291 days.

(21) Appl. No.: 12/736,915

(22) PCT Filed: Sep. 25, 2008

(86) PCT No.: PCT/NL2008/050618
§ 371 (c)(1),
(2), (4) Date: Jan. 31, 2011

(87) PCT Pub. No.: WO2010/036098
PCT Pub. Date: Apr. 1, 2010

(65) Prior Publication Data
US 2011/0123068 A1    May 26, 2011

(51) Int. Cl.
*G06K 9/32* (2006.01)
(52) U.S. Cl.
USPC ........... 382/299; 382/103; 382/105; 382/118; 382/270; 382/264
(58) Field of Classification Search
USPC ................. 382/103–107, 118, 154, 260–264, 382/283–285, 291, 270, 299
See application file for complete search history.

(56) References Cited

U.S. PATENT DOCUMENTS

| | | | |
|---|---|---|---|
| 6,985,620 B2 * | 1/2006 | Sawhney et al. | 382/154 |
| 7,657,171 B2 * | 2/2010 | Sundstrom | 396/133 |
| 8,126,190 B2 * | 2/2012 | Jung et al. | 382/100 |
| 8,203,609 B2 * | 6/2012 | Jung et al. | 348/143 |
| 8,212,872 B2 * | 7/2012 | Sablak | 348/143 |
| 2003/0108240 A1 * | 6/2003 | Gutta et al. | 382/181 |
| 2004/0081338 A1 | 4/2004 | Takenaka | |
| 2004/0208394 A1 * | 10/2004 | Kurata | 382/275 |
| 2004/0232459 A1 * | 11/2004 | Takayama et al. | 257/295 |

(Continued)

FOREIGN PATENT DOCUMENTS

| | | |
|---|---|---|
| EP | 1081654 | 3/2001 |
| EP | 1081654 A2 * | 3/2001 |

(Continued)

OTHER PUBLICATIONS

A track based--contexts, Park et al., IEEE, 0/7803-9385-6, 2005, pp. 171-176.*
International Search Report, 2009.

*Primary Examiner* — Jayesh A Patel (57) ABSTRACT

A method of reducing the spatial resolution of images is disclosed. At least one embodiment of the method includes: —acquiring an input image including image parts having a spatial resolution larger than SR pixels/meter; —acquiring a depth map associated with the input image; —determining for each pixel p(x,y) a spatial resolution value by means of the depth map; —processing a region of pixels of the input image for which holds that the spatial resolution value is larger than a predefined threshold corresponding to SR pixels/meter to obtain a corresponding region of pixels having a spatial resolution smaller then or equal to SR pixels/meter in an output image. The method enables to removes privacy information from images by reducing the spatial resolution to a level that the privacy information cannot be recognized in the image anymore.

9 Claims, 6 Drawing Sheets

(56) References Cited

U.S. PATENT DOCUMENTS

| | | | |
|---|---|---|---|
| 2004/0252864 A1* | 12/2004 | Chang et al. | 382/104 |
| 2007/0165964 A1* | 7/2007 | Wolf et al. | 382/276 |
| 2008/0259154 A1* | 10/2008 | Garrison et al. | 348/14.01 |
| 2009/0262987 A1* | 10/2009 | Ioffe et al. | 382/118 |
| 2010/0205667 A1* | 8/2010 | Anderson et al. | 726/19 |

FOREIGN PATENT DOCUMENTS

| | | |
|---|---|---|
| EP | 1388802 | 2/2004 |
| EP | 1418444 | 5/2004 |
| WO | WO 2008048088 | 4/2008 |

* cited by examiner

METHOD OF AND ARRANGEMENT FOR BLURRING AN IMAGE

FIELD OF THE INVENTION

The present invention relates to the field of processing images and associated depth information.

In an embodiment, the invention also relates to the field of removing privacy sensitive data from such images. The privacy sensitive data may relate to human faces or license plates.

BACKGROUND OF THE INVENTION

In some MMS applications, the intention is to capture especially pictures of building facades and other fixed objects, like billboards, street signs and street lamps, that are later used in "real-world" 2D and/or 3D images of streets used in e.g. car navigation system. Then, these images are shown to drivers of a car provided with such a navigation system such that the driver sees 2D and/or 3D images on a screen of the navigation system corresponding with the real world view when looking through the windows of the car. Such pictures may also be used in other applications than car navigation systems, for instance, in games that can be played on computers either as a stand alone systems or as cooperating in a networked environment. Such an environment may be the Internet. The applications may include spatial browsers in a similar way to the car presentation but where the user adjusts his virtual position which may be on or above the surface of the earth. The solution of the present invention as presented below is not restricted to a specific application.

However, millions of such MMS images may contain privacy information such as faces of people and readable license plates of cars that are unintentionally present on the images. It is desirable not to use such images in public applications with such privacy or other undesired information still intact. For instance, newspapers have reported about such undesired information being present in images used in Street View™ views distributed by Google™. According to an article on //news.cnet.com dated May 13, 2008 Google has begun testing face-blurring technology in its Street View service. Images taken in a real world condition represent static and moving objects in the vicinity of the MMS. In the images, the objects having such privacy or other undesired information may be static or moving relative to the fixed world. One has to identify such objects in the images taken by the camera on the MMS. Some prior art applications have tried to identify moving objects only on the basis of image properties and determine their trajectory of movement based on color pixel properties in sequences of images. However, such an approach works only as long as objects can be determined on more then two images in sequence to determine the trajectory.

Others have disclosed systems in which other types of sensors are used to determine short time trajectory approximation of objects relative to a vehicle arranged with such sensors. Such sensors may include laser scanners, radar systems and stereo-video cameras. Such systems are, for instance, referred to in the introduction of EP 1 418 444. This document relates to real-time applications where relative positions and speeds of objects to the vehicle are important, for instance, in order to avoid accidents between the vehicle and the objects. The document does not disclose how the position and speed data obtained by the sensors can be mapped on image data obtained by the stereo-video cameras. Moreover, it does not disclose how to determine absolute positions and absolute speeds of such objects. Here, "absolute" is to be understood in the sense of being absolute relative to the fixed real world as determined by the earth and objects fixed to the earth, like buildings, traffic signs, trees, mountains, etc. Such a real world can be, for instance, defined by a reference grid as used by the GPS system. Moreover, this document does not address how to deal with privacy sensitive data in images taken by the video cameras.

The use of laser scanner data to assist in identifying locations of building footprints is for example described in co-pending patent application PCT/NL2006/050264.

Others try to either remove or blur people faces close-ups by recognition and/or detection of people faces in the image. The same method applies to car license plates.

Photoshop CS comprises a lens blur filter that uses a depth map to blur images. The lens blur filter enables one to create a depth of field in photos. A focal distance, iris shape and radius, and amount of noise and corresponding distribution has to be chosen or varied to obtain a desired result. Objects at the focal distance will not be blurred and will consequently show the object clearly.

SUMMARY OF THE INVENTION

The present invention seeks to provide a method of and arrangement for reducing the spatial resolution of images. More particularly, the invention seeks to provide a method of and arrangement form removing privacy information from images.

According to the invention, the method comprises:
acquiring an input image comprising image parts having a spatial resolution larger than SR pixels/meter;
acquiring a depth map associated with said input image;
determining for each pixel p(x,y) a spatial resolution value by means of the depth map;
processing a region of pixels of said input image for which holds that the spatial resolution value is larger then a predefined threshold corresponding to SR pixels/meter to obtain a corresponding region of pixels having a spatial resolution smaller then or equal to SR pixels/meter in an output image.

The present invention uses depth image information coming from a 3-D point cloud delivered by synchronized laser or range sensor, 3D camera (cameras which add to image depth information) or depth information as results of image processing based on photogram metric approach, for example by processing stereo images, or others image processing techniques that leads to positioning or depth information in imagery. The depth information is used to determine a transformation of images so they have certain maximum metric spatial resolution. The measure of how closely lines can be resolved in an image is called spatial resolution, and it depends on properties of the system creating the image, not just the pixel resolution of the final picture, measured in pixels per inch (ppi). For practical purposes the clarity of the image is decided by its spatial resolution and not the number of pixels in an image. In effect, spatial resolution refers to the number of independent pixel values per unit length. In other words, the spatial resolution defines the clarity of an object in relation to the real world size of the object and not the size of pixels in the image.

The invention is based on the recognition that people and car license plates, at a certain image resolution, are not recognizable anymore and features of navigation interest like: buildings, trees, monuments, junctions, commercials and other non-private texts are still well recognizable at a resolution around said certain image resolution.

According to article "Face Hallucination and Recognition", by Xiaogang Wang et all, for automatic face recognition, a lower resolution bound is found through experiments.

The bound is defined by the number of pixels between the eye centers. The distance between eyes is generally in the range of 45-80 mm. The average distance is 63 mm. A resolution with 10 pixels between the eye centers is found to be a lower bound for recognition. Below this level there may not be enough information for recognition. Article "Video-Based Framework for Face Recognition in Video", by D. Gorodnichy, May 2005, published at Second Workshop on Face Processing in Video (FPiV'05) in Proceedings of Second Canadian Conference on Computer and Robot Visio (CRV'05). pp. 330-338. Victoria, British Columbia, Canada. May 9-11, 2005. ISBN 0-7695-2319-6. NRC 48216, approves this by stating that humans can easily recognize a face in video as long as it has a resolution of at least 12 pixels between the eyes.

The recognition that people and car license plates and features of navigation interest need a different spatial resolution to be recognized in images enables us to use a very simple image transformation based on image depth, which unifies resolution across the image to a maximum spatial resolution. Such transformation can be very rapid and very simple and ensures that small (private) details are blurred regardless of where they are in the original image (how close), while buildings remain either unchanged on the image (when they are farther then, say, 10 m) or blurring leaves them still recognizable for presentation purposes (internet or navigations device).

The depth information is used to determine for which parts or pixels of the image the spatial resolution is above a predefined threshold SR. By applying a blurring algorithm to those parts or pixels the spatial resolution is reduced to at least said predefined threshold SR. The regions of pixels having a spatial resolution above the predefined threshold SR belong to content potentially critical to privacy whereas the regions of pixels having a spatial resolution below the predefined threshold SR belong to non-private information.

The proposed methodology addresses not only faces or text related privacy details but also all other details on skin, (tattoo or other characteristic details) or on cars and cloths like decorations or painting. In addition by its nature in images, the method according to the invention does not affect the readability of commercials or logos. Others methods potentially do not have this feature.

In an embodiment of the invention, the action processing a region of pixels for which holds that the spatial resolution value is larger than the predefined threshold comprises:
  determining a transformation function having a transformation window for pixel p(x,y) from the spatial resolution values associated with the region of pixels; and
  performing the transformation function for pixel p(x,y) to obtain the color value for pixel p(x,y) in the output image.

These features enables us to adapt only the pixels having a spatial resolution which is larger than the predefined threshold SR of y pixel/meter.

In a further embodiment, the transformation function obtains the color value for pixel p(x,y) by calculating an average color value c from pixels of the input image associated with the transformation window. These features provide a simple algorithm to determine a new value for pixels and obtaining a blurred image wherein faces and license plates can not be recognized.

In another embodiment of the invention, the action processing a region of pixels for which holds that the spatial resolution value is larger than the predefined threshold comprises:
  determining first regions of pixels having a spatial resolution value falling in a first predetermined range;
  performing an image processing operation on said first regions of pixels to obtain pixels values of the output image, wherein the image processing operation corresponds to subsequently down-sampling and up-sampling the first regions of pixels having said spatial resolution with a factor associated with said first predetermined range. These features provide a simple and effective algorithm to reduce the spatial resolution of images.

According to the invention, the spatial resolution of a processed region in the output image is less than 100 pixels/meter to protect privacy information related to human faces and less than 50 pixels/meter to protect privacy information related to license plates.

In an embodiment of the invention, the method further comprises determining regions of interest which do not comprise privacy information, and wherein the processing action is adapted to exclude the pixels associated with said regions of interest from processing. These features enables one to degrade only the resolution of parts of an image which could comprise privacy information.

In an embodiment, the method further comprises:
  determining the height of a group of pixels above the earth surface;
  wherein the processing a group of pixels is arranged to reduce the spatial resolution of the group of pixels in dependence of the determined height.

It is another object of the invention to provide a computer implemented system for reducing the spatial resolution of images, the system comprising a processor and memory connected to the processor, the memory comprising a computer program comprising data and instructions arranged to allow said processor to perform any of the methods according to the invention.

It is further an object of the invention to provide a method which enables a computer implemented system to generate content to be stored in a ground control database.

It is yet a further object of the invention to provide a program product in a computer readable medium for use in a data processing system, for reducing the spatial resolution of images, the computer program product comprising instructions arranged to allow a processor to perform any of the methods according to the invention.

SHORT DESCRIPTION OF DRAWINGS

The present invention will be discussed in more detail below, using a number of exemplary embodiments, with reference to the attached drawings, in which The invention will be explained in detail with reference to some drawings that are only intended to show embodiments of the invention and not to limit the scope. The scope of the invention is defined in the annexed claims and by its technical equivalents.

DETAILED DESCRIPTION OF EXEMPLARY EMBODIMENTS

The present invention mainly relates to the field of processing images taken by cameras and range data taken by range sensors mounted on a Mobile Mapping Systems (MMS). More generally, the invention relates to the field of processing images having associated depth information, which enables one to estimate for each pixel of the image the distance between the surface represented by said pixel and the camera. More specifically, in some embodiments, the invention relates to eliminating privacy sensitive data in these images.

Figure 1:
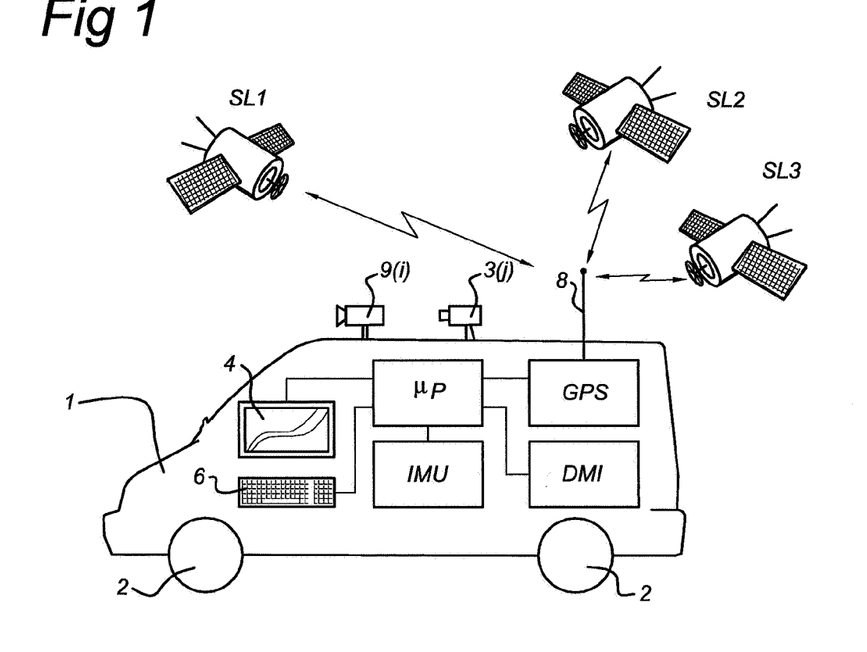
FIG. 1 shows a MMS system with a camera and a laser scanner.

FIG. 1 shows a MMS system that takes the form of a car 1. The car 1 is provided with one or more cameras 9(I), I=1, 2, 3, . . . I, and one or more laser scanners 3(j), j=1, 2, 3, . . . J. In the context of the present invention, if moving objects have to be identified, information from at least two or more laser scanners 3(j) is used. The car 1 can be driven by a driver along roads of interest. The laser scanners 3(j) can be substituted by any kind of range sensor that allows, for some set of bearings, a detection of a distance between the range sensor and an object sensed by the range sensor. Such an alternative range sensor can, for instance be a radar sensor or a Lidar sensor. If a radar sensor is used its range and bearing measurement data should be comparable to those as can be obtained with a laser scanner.

The term "camera" is understood here to include any type of image sensor, including for instance, still camera, video camera, a Ladybug™ or similar 360 degree camera.

The car 1 is provided with a plurality of wheels 2. Moreover, the car 1 is provided with a high accuracy position/orientation determination device. Such a device is arranged to provide 6 degree of freedom data as to position and orientation of the car 1. An embodiment is shown in FIG. 1. As shown in FIG. 1, the position/orientation determination device comprises the following components:

- a GPS (global positioning system) unit connected to an antenna 8 and arranged to communicate with a plurality of satellites SLk (k=1, 2, 3, . . . ) and to calculate a position signal from signals received from the satellites SLk. The GPS unit is connected to a microprocessor μP. The microprocessor μP is arranged to store the data received from the GPS unit as a function of time. Such data will be sent to an external computer arrangement for further processing. In an embodiment, based on the signals received from the GPS unit, the microprocessor μP may determine suitable display signals to be displayed on a monitor 4 in the car 1, informing the driver where the car is located and possibly in what direction it is traveling.
- a DMI (Distance Measurement Instrument). This instrument is an odometer that measures a distance traveled by the car 1 by sensing the number of rotations of one or more of the wheels 2. The DMI is also connected to the microprocessor μP. The microprocessor μP is arranged to store the data received from the DMI as a function of time. Such data will also be sent to the external computer arrangement for further processing. In an embodiment, the microprocessor μP takes the distance as measured by the DMI into account while calculating the display signal from the output signal from the GPS unit.
- an IMU (Inertial Measurement Unit). Such an IMU can be implemented as three gyro units arranged to measure rotational accelerations and three translational accelerators along three orthogonal directions. The IMU is also connected to the microprocessor μP. The microprocessor μP is arranged to store the data received from the IMU as a function of time. Such data will also be sent to the external computer arrangement for further processing.

The system as shown in FIG. 1 collects geographic data, for instance by taking pictures with one or more camera(s) 9(i) mounted on the car 1. The camera(s) are connected to the microprocessor μP. Moreover, the laser scanners 3(j) take laser samples while the car 1 is driving along roads of interest. The laser samples, thus, comprise range data relating to the objects visualized in the images, and may include data relating to building blocks, to trees, traffic signs, parked cars, people, etc.

The laser scanners 3(j) are also connected to the microprocessor μP and send these laser samples to the microprocessor μP.

It is a general desire to provide as accurate as possible location and orientation measurements from the three measurement units: GPS, IMU and DMI. These location and orientation data are measured while the camera(s) 9(i) take pictures and the laser scanners 3(j) take laser samples. Both the pictures and the laser samples are stored for later use in a suitable memory of the microprocessor μP in association with corresponding location and orientation data of the car 1 at the time these pictures and laser samples were taken. An alternative way of correlating all data from the GPS, IMU, DMI, camera(s) 9(i) and laser scanners 3(j) in time is to time stamp all these data and store the time stamp data in conjunction with the other data in the microprocessor's memory. Other time synchronization markers can be used instead.

In an embodiment, the laser scanner(s) 3(j) are arranged to produce an output with minimal 50 Hz and 1 deg resolution in order to produce a dense enough output for the method. A laser scanner such as MODEL LMS291-S05 produced by SICK is capable of producing such output.

Figure 2:
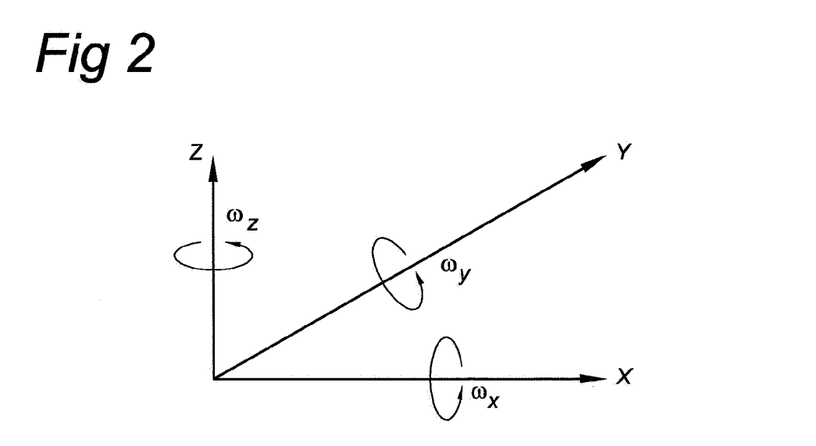
FIG. 2 shows a diagram of location and orientation parameters.

FIG. 2 shows which position signals can be obtained from the three measurement units GPS, DMI and IMU shown in FIG. 1. FIG. 2 shows that the microprocessor μP is arranged to calculate 6 different parameters, i.e., 3 distance parameters x, y, z relative to an origin in a predetermined coordinate system and 3 angle parameters $\omega_x$, $\omega_y$, and $\omega_z$, respectively, which denote a rotation about the x-axis, y-axis and z-axis respectively. The z-direction coincides with the direction of the gravity vector.

Figure 3:
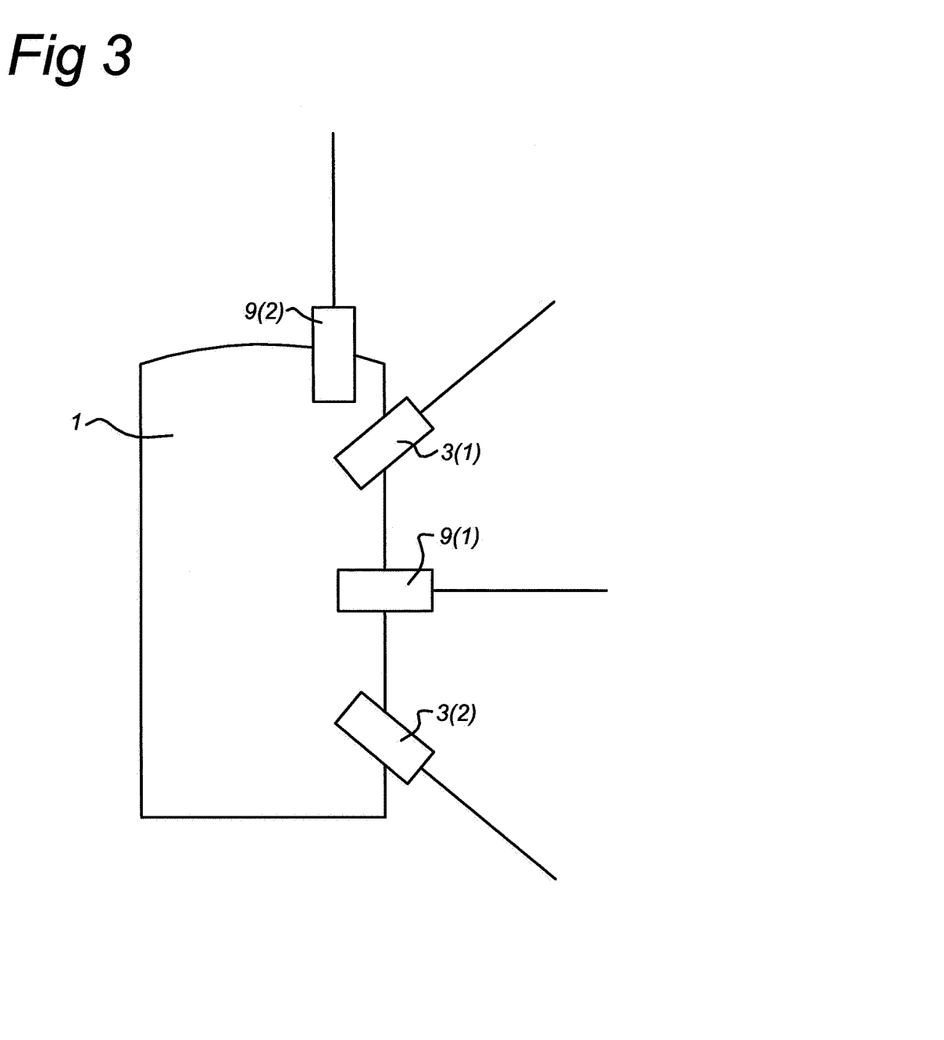
FIG. 3 shows a schematic top view of a car provided with two cameras and two range sensors on its roof.

FIG. 3 shows the MMS with two range sensors 3(1), 3(2) (that may be laser scanners but, alternatively, may for instance be radars), and two cameras 9(1), 9(2). The two range sensors 3(1), 3(2) are arranged on the roof of the car 1 such that they are directed towards a right side of the car 1 as viewed relative to a driving direction of the car 1. The scanning direction of range sensor 3(1) is indicated with line SD1 whereas the scanning direction of range sensor 3(2) is indicated with line SD2. The camera 9(1) is viewing to the right side too, i.e., it may be directed perpendicular to the driving direction of car 1. The camera 9(2) is viewing in the driving direction. This setup is suitable for all those countries where vehicles drive in right lanes. The setup is preferably changed for those countries where vehicles drive on the left side of the street in the sense that the camera 9(1) and the laser scanners 3(1), 3(2) are located on the left side of the car's roof (again "left" being defined relative to the driving direction of car 1). It should be understood that many other configurations could be used by one skilled in the art.

The microprocessor in the car 1 may be implemented as a computer arrangement. An example of such a computer arrangement is shown in FIG. 4.

Figure 4:
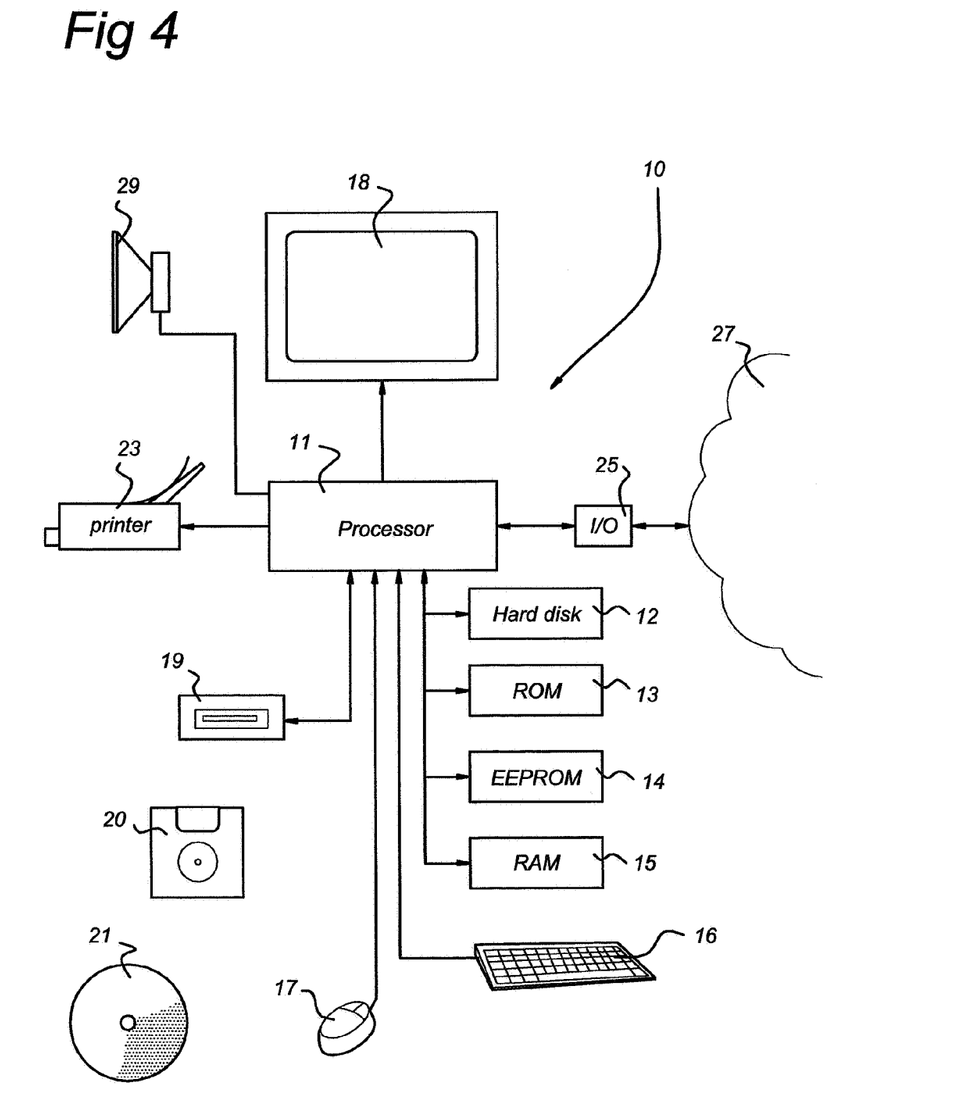
FIG. 4 shows a diagram of a computer arrangement with which the invention can be performed.

In FIG. 4, an overview is given of a computer arrangement 10 comprising a processor 11 for carrying out arithmetic operations.

The processor 11 is connected to a plurality of memory components, including a hard disk 12, Read Only Memory (ROM) 13, Electrically Erasable Programmable Read Only Memory (EEPROM) 14, and Random Access Memory (RAM) 15. Not all of these memory types need necessarily be provided. Moreover, these memory components need not be located physically close to the processor 11 but may be located remote from the processor 11.

The processor 11 is also connected to means for inputting instructions, data etc. by a user, like a keyboard 16, and a mouse 17. Other input means, such as a touch screen, a track ball and/or a voice converter, known to persons skilled in the art may be provided too.

A reading unit 19 connected to the processor 11 is provided. The reading unit 19 is arranged to read data from and possibly write data on a data carrier like a floppy disk 20 or a CDROM 21. Other data carriers may be tapes, DVD, CD-R. DVD-R, memory sticks etc. as is known to persons skilled in the art.

The processor 11 is also connected to a printer 23 for printing output data on paper, as well as to a display 18, for instance, a monitor or LCD (Liquid Crystal Display) screen, or any other type of display known to persons skilled in the art.

The processor 11 may be connected to a loudspeaker 29.

The processor 11 may be connected to a communication network 27, for instance, the Public Switched Telephone Network (PSTN), a Local Area Network (LAN), a Wide Area Network (WAN), the Internet etc. by means of I/O means 25. The processor 11 may be arranged to communicate with other communication arrangements through the network 27. These connections may not all be connected in real time as the vehicle collects data while moving down the streets.

The data carrier 20, 21 may comprise a computer program product in the form of data and instructions arranged to provide the processor with the capacity to perform a method in accordance with the invention. However, such computer program product may, alternatively, be downloaded via the telecommunication network 27.

The processor 11 may be implemented as stand alone system, or as a plurality of parallel operating processors each arranged to carry out subtasks of a larger computer program, or as one or more main processors with several sub-processors. Parts of the functionality of the invention may even be carried out by remote processors communicating with processor 11 through the network 27.

It is observed that when applied in the car 1 the computer arrangement does not need to have all components shown in FIG. 4. For instance, the computer arrangement does not need to have a loudspeaker and printer then. As for the implementation in the car 1, the computer arrangement needs at least processor 11, some computer or processor readable memory to store a suitable program and some kind of interface to receive instructions and data from an operator and to show output data to the operator.

For post-processing the pictures, scans and stored position and orientation data as taken by the camera(s) 9($i$), the laser scanner(s) 3($j$) and the position/orientation measurement devices, respectively, a similar arrangement as the one shown in FIG. 4 will be used, be it that that one will not be located in the car 1 but may conveniently be located in a building for off-line post-processing. The pictures, scans, i.e. range data, and position/orientation data as taken by camera(s) 9($i$), scanner(s) 3($j$) and position/orientation measurement devices are stored in one of the memories 12-15. That can be done via storing them first on a DVD, memory stick or the like, or transmitting them, possibly wirelessly, from the memory 12, 13, 14, 15 to another computer readable medium. All measurements are preferably also time stamped and these various time measurements are stored as well.

In an embodiment of the invention, the arrangement shown in FIG. 1 should be able to estimate for each pixel the distance between the camera and the surface of an object visualised by said pixel.

An objects may be moving relative to the fixed world. Such moving objects may be people and cars. Identifying the distance between moving objects in images and the camera may be more difficult than identifying the distance between fixed objects and the camera. By using only one laser scanner 3($j$), one can identify non-moving objects and properly map the range data to images but it is very difficult to identify moving objects properly in images. Therefore, in the embodiments relating to objects having a certain speed the invention relates to a MMS with one or more cameras 9($i$) and two or more laser scanners 3($j$). Then, two point clouds of the same object but as generated from the two different laser sensors 3($j$) are used to determine a short time trajectory of the moving object which will be used to estimate the position of the object as a function of time. Such an estimate of the position of the object as a function of time will then be used to estimate the distance to the object in images collected by the camera(s) 9($i$) in a time period that also laser scanner or range data was collected. Using laser scanning data, i.e. range data, to assist in estimating the position of moving objects is for example described in co-pending patent application PCT/NL2007/050541. Another method which uses laser scanning data to assist in determining regions of interest in images is described in co-pending patent application PCT/NL2008/050227. Patent application WO2008/054203 describes a method to map laser scanner samples on images.

Figure 5:
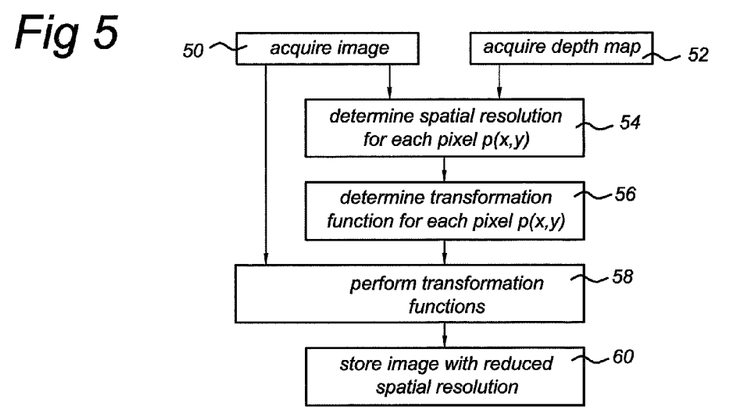
FIG. 5 shows a flow chart of a basic process in accordance with an embodiment of the invention.

First of all, FIG. 5 shows a flow chart showing basic actions of the present invention as performed on computer arrangement 10. Before explaining the actions of FIG. 5 in detail, they will be briefly mentioned here.

In action 50, the computer arrangement 10 receives an image from a computer readable medium. The image could be any type of image taken by a camera. From the image should be known the angular resolution. The angular resolution in the present description describes the angle formed by a first line through a pixel of an image sensing element, for example a CCD, and the focal point of the camera and a second line through an adjacent pixel of said sensing element and the focal point. Assuming that a camera is always in focus on all distances, this will result in an image having a spatial resolution which depends on the distance between an object in the viewing window of the camera and the focal point of the camera. Consequently, the spatial resolution of an object visualised in an image reduces with an increase of the distance between the object and the camera at the moment of capturing the image.

In action 52, the computer arrangement 10 receives a depth map associated with the image received in action 50.

In action 54, the computer arrangement 10 estimates the spatial resolution for each pixel by using the depth information in the depth map.

In action 56, the computer arrangement 10 determines a transformation function for each pixel p(x,y) of the image in dependence of the estimated spatial resolution associated said pixel.

In action 58, the computer arrangement 10 performs the transformation functions determined in action 56 on the pixels of the image to obtain a image with reduced spatial resolution thereby rendering the picture free of privacy info.

In action 60, the computer arrangement 10 stores the image with reduced spatial resolution on a computer readable medium, such as a DVD, hard-disc, tape, flash memory, etc.

Now each of the actions is explained in more detail. In an embodiment of the invention actions 50 and 52 could be performed by a MMS system as shown in FIG. 1 and described in corresponding description. Such a system provides perspective images having a known angular resolution, and range data in the form of laser clouds that can be associated with the images by means of the simultaneously recorded and stored position and orientation data. By means of commonly known techniques, the laser samples can be mapped on the image space of an image, providing depth information associated with said image. It should be noted that stereo images or image sequences could be used to calculate a depth map to be associated with an image. For image sequences it is important that the distance between the camera position of two subsequent images is not to large and that the position and orientation of the camera is accurately known. In other words, the subsequent images should have enough overlap to enable a software program to find matching areas in the images and to determine the distance by means of triangulation corresponding to said matching areas.

The invention can be applied on any pair of image and associated depth map, wherein the depth map comprises sufficient information to estimate for each pixel p(x,y) the distance between the surface of the object visualized by said pixel and the camera. Some examples of a depth map are a depth image having a similar image size as the associated image, a laser cloud associated with the image from a laser scanner device, a ladar or lidar image, depth information derived from stereo image pair.

In action 54, the spatial resolution for each pixel p(x,y) is determined. Assume a camera is used with a horizontal angle of view or field of view of 90 degrees which generates an image with a line of 1000 pixels. The angular resolution can be estimate by 90/1000 which is 0.009 degree/pixel. The spatial resolution for a pixel can be approximated by the following equation:

$$SPR = \frac{\text{number\_of\_line\_pixels}}{2 \times dist \times \tan\left(\frac{\text{angle\_of\_view}}{2}\right)} \quad [1]$$

wherein:
SPR is the approximated spatial resolution,
number_of_line_pixels is the number of pixels of an image line,
dist is assumed distance between object visualized and camera, and
angle_of_view is the angle of view of the camera.

The skilled person would recognize that Equation 1 is an approximation of the spatial resolution. The more a pixel is spaced from the centre pixel of the image, the more the spatial resolution for a pixel will decrease. The centre pixel of an image is the pixel representative of the viewing angle of the camera.

It should further be noted that from the depth map the orientation of the surface with respect to the direction of view of a pixel can be determined. This orientation of the surface determines also the visual spatial resolution of the pixels. The less a pixel represents a surface perpendicular to the direction of view, the less the spatial resolution of the surface will be in the image.

Figure 6A:
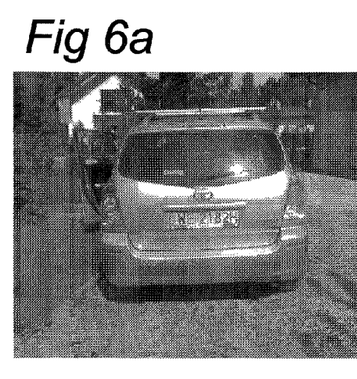
FIGS. 6a-6d show the effect of reducing the spatial resolution on the readability of license plates; and, FIGS. 7a-7c and 8a-8c show a first and second example of an original image, corresponding depth image and transformed image with reduced spatial depth and at the right a cut-out of the original image and transformed image.
Figure 6B:
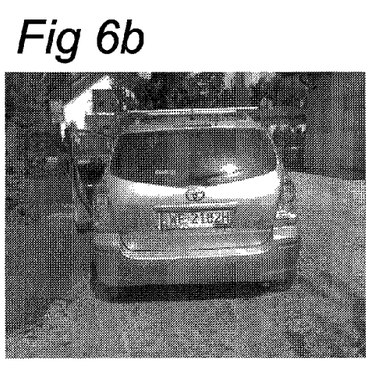
Figure 6C:
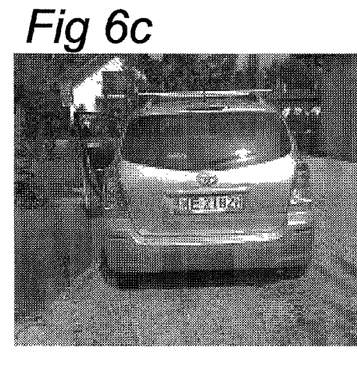
Figure 6D:
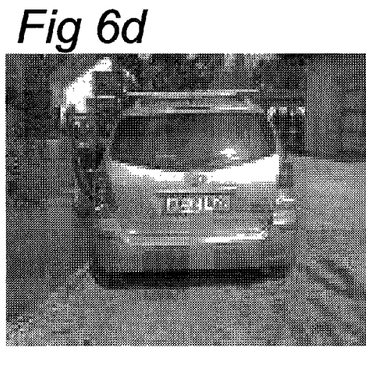

In action 56, the determined spatial resolutions for the pixels are used to determine the transformation function that has to be performed on the respective pixels to reduce the spatial resolution at object distance to render the image free of privacy information. From literature, it is known that faces can not be recognized automatically when the number of pixels between the centres of the eyes is below 10 pixels. The average distance between the centres of the eyes is 6.3 cm. This makes that if the spatial resolution is less than 168 pixels/meter, in such an image it will be hard to recognize the face. FIG. 6a shows an original image of a car with license plate. FIGS. 6b, 6c and 6d show the same original image but with reduced resolution corresponding to a spatial resolution of 200, 100 and 50 pixels/meter at license plate distance respectively. It can be seen that with a spatial resolution around 100 pixels per meter at license plate distance, the numbers can still be recognized but becomes blurred. However, if the spatial resolution is reduced to around 50 pixels/meter at license plate distance, the numbers are blurred to much to be recognized. In an embodiment of the invention, only for pixels having a spatial resolution at object distance higher than a predefined threshold SR a transformation function is determined. The predefined threshold SR could be defined in number (SR) of pixels/meter. The predefined threshold to be used depends on the characteristics of the privacy information to be protected for recognition and the capabilities of algorithms to detect/recognize automatically the privacy information in 'blurred', vague or low resolution images. It has been found that different thresholds for human faces, license plates, tattoos etc. A threshold SR corresponding to a spatial resolution of 100 pixels/meter is regarded to be sufficient to enable blurring of the image in such a way that faces cannot be recognized/identified anymore in the blurred image. A threshold SR corresponding to a spatial resolution of 50 pixels/meter is regarded to be sufficient to enable blurring of the image in such a way that both faces and license plates does not comprise sufficient information for recognition of the face or characters on the license plate.

It should be noted that the spatial resolution could be defined as the resolution on a surface in plane with a direction perpendicular to the direction of view. The spatial resolution could also be defined as the visible resolution on the real surface of the visualized object. In that case the orientation of the surface with respect to the viewing direction is taken into account. By taking into account the orientation, the spatial resolution will have a lower value. Consequently, for less pixels a transformation function has to be determined and a greater part of the original image will appear unchanged, i.e. not-transformed in the image with reduced spatial resolution.

In an embodiment, for each pixel having a determined spatial resolution above the predetermined threshold SR a transformation function will be selected. The transformation function can be any filter performing a low pass filtering on the pixel p(x,y) and neighbouring pixels. The difference between spatial resolution of pixel p(x,y) and the desired maximum spatial resolution in the image defined by the threshold SR defines the number of neighbouring pixels, i.e. the transformation window of the transformation function, that should be used to calculate a new colour value for the pixel in the blurred image. It might be clear that the transformation window size decreased with increase of the distance between the surface represented by pixel p(x,y) and the camera.

In an embodiment, the color value for pixel p(x,y) is obtained by calculating an average color value c from pixels of the input image associated with the transformation window. However, any other low-pass image filter could be used which lowers the spatial resolution to at least the desired spatial resolution defined by the threshold SR. In an embodiment, the centre pixel of the transformation window coincides the pixel p(x,y) in the input image to determine the color value for pixel p(x,y) in the output image.

In another embodiment, a limited number of transformation functions is used. The transformation functions have a window of N×N pixels, N being an odd number larger than 1. In this embodiment, each of the transformation function is suitable to decrease the spatial resolution with a predetermined amount and could be used if the difference between the spatial resolution in the original image and the desired spatial resolution is within a predefined range. Thus by determining said difference the corresponding transformation function can be selected. As the desired resolution is fixed value, the spatial resolution of a pixel p(x,y) in the original image can be used to select the appropriate transformation function.

In another embodiment, the transformation function is determined in the following way. Firstly, the pixels having a spatial resolution larger than the threshold SR are selected. Secondly, the pixels are divided into groups each group will comprise only pixels within a defined a range of spatial resolutions. The ranges have been selected such that a transformation function corresponding to subsequently down-sampling and up-sampling pixels having said spatial resolution with a range associated factor, such that the spatial resolution will be at most the desired spatial resolution to render the image free of privacy information. In this way, for each pixel a new colour value will be determine. In this embodiment, the upsampling part of the transformation will cause blocking effects in the final image. Afterwards a smoothing filter could be performed on the transformed pixel regions to reduce the blocking effect and providing an image with a better visual quality.

Figure 7A:
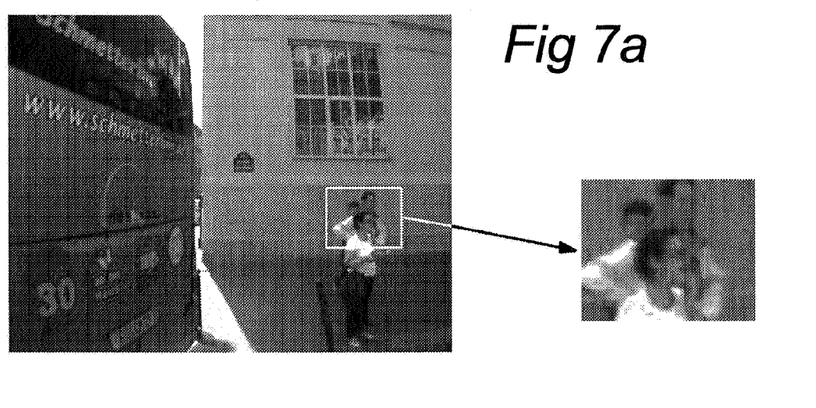
Figure 7B:
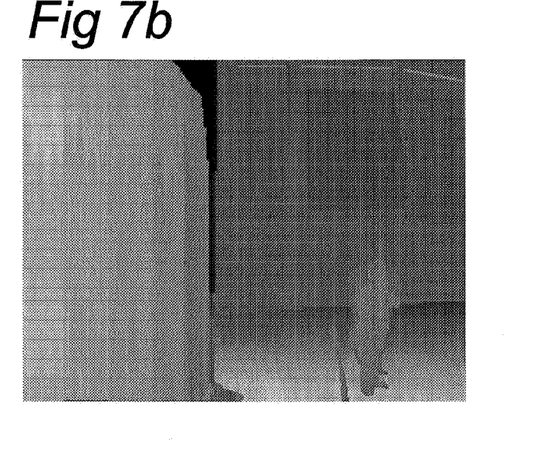
Figure 7C:
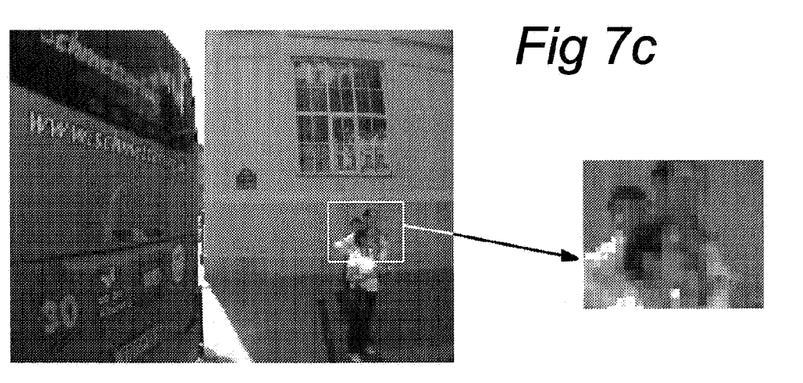

FIGS. 7a-7c and 8a-8c show a first and second example of an original image, corresponding depth image and transformed image with reduced spatial depth and at the right a cut-out of the original image and transformed image. In FIGS. 7a and 7c can be seen that the spatial resolution of the area corresponding to the faces in the image is reduced sufficiently. FIG. 7b is a depth map image associated with image of FIG. 7a. The transformation function performed corresponds to down sampling and upsampling the corresponding regions. The spatial resolution of the faces in the transformed image is around 33 pixels/meter. The cut-out of the transformed image showing the region with faces illustrate clearly that different transformations are performed on pixels having different spatial resolutions in the original image. This can be seen by the size of the blocks in the transformed image. The farther away a face is, the smaller the size of the blocks in the transformed image. It can further be seen that the farther away the object surface is, the less the object will be blurred.

Figure 8A:
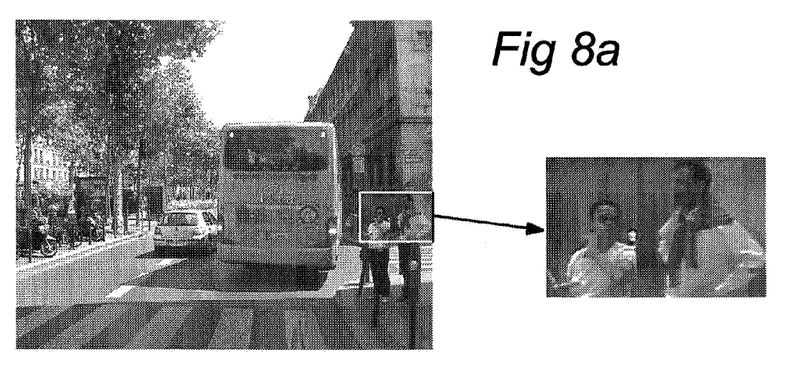
Figure 8B:
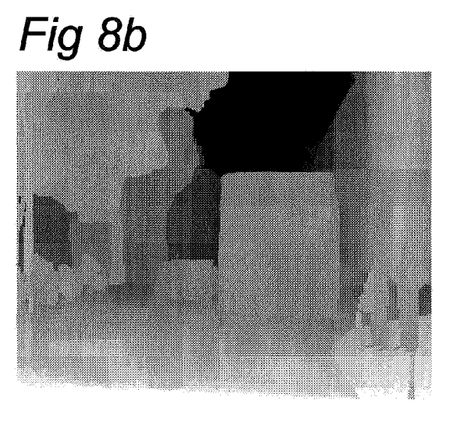
Figure 8C:
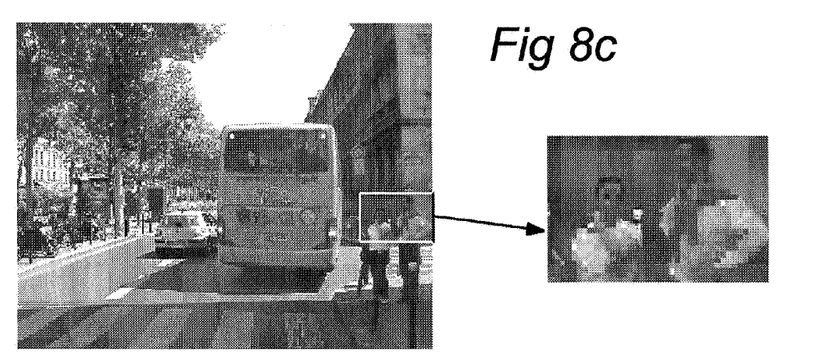

FIG. 8a-8c show similar effects. Furthermore can be seen from FIG. 8c, that the street signs remain visible and detectable in the image.

The methods described above use only depth information to determine which parts of the image have to be processed. No complicated face recognition and license plate recognition algorithms have to be applied to determine which parts of the image have to be blurred. The method described above could be further improved by algorithms that determine which parts of the image do or could not comprise privacy object. For example, an algorithm could be used to detect bill-boards, street signs, light poles, etc. These parts indicated as not of privacy concerns, could be excluded from the part of the image to be processed, i.e. to be blurred. This will result in a transformed image wherein said part will appear as they were present in the original image comprising all available details. License plates as well as faces are clearly visible in the original image (having equal angular resolution) whereas in the transformed image blurred with the method according to the invention (having a maximal metric resolution or spatial resolution SR of 33 pixels/meter) license plates as well as faces cannot be recognized anymore. In this case, the method further comprises determining regions of interest which do not comprise privacy information, and wherein the processing action is adapted to exclude said regions of interest from processing.

In an embodiment, the method further comprises determining the height of the surface visualized by a pixel above the earth surface. The height can easily derived from the range data or any other depth map. Generally, faces are at least one meter above the earth surface and license plates are below one meter above the earth surface. This allows us to distinguish between regions and applying different degree of blurring on the respective regions. For example, pixels in regions at a level in a range above 1 meter and below 2.5 meters are blurred to have a spatial resolution up to 168 pixels/meter, pixels in regions at a level below 1 meter are blurred to have a spatial resolution up to 50 pixels/meter and the pixels and pixels in regions at a level above 2.5 meter are excluded from blurring. This has further the advantage that navigation information will be blurred less or not at all.

The presented method could be performed automatically on images and associated depth information. The method could be used in a semi-automatic or manual process. In an embodiment, the method comprises the step to determine one or region having a spatial resolution above a predefined threshold. If such regions exist, the corresponding one or regions are indicated on a display device for display to a operator. The operator will examine the one or more regions and indicate by means of an input device whether are not the one or more regions have to be blurred. For example, he could select by means selecting one of two input buttons whether the one or more regions have to be blurred. More buttons could be used to provided a selection between degree of blurring, i.e. the maximum spatial resolution in the final output image. In this way, the operator identifies the degree of blurring and the blurring of the original image can be reduced to a minimum. In that case the method comprises the step of receiving an input signal indicative of the degree of blurring, i.e. the maximum spatial resolution allowed and the processing step is arrange to process the pixels associated with said one or more regions under control of the input signal. According to this embodiment, an operator would only have to click 'blur OK' or 'NOT blur' and a next region in the present image or subsequent image will be automatically identified and the operator has to decide which operation has to be performed on the identified region.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. A method of reducing the spatial resolution of images comprising:
acquiring an input image comprising image parts having a spatial resolution larger than a predefined threshold SR pixels/meter, where the spatial resolution is associated with a clarity of an image;
acquiring a depth map associated with said input image;
determining for each pixel p(x,y) a spatial resolution value by means of the depth map; and
processing a region of pixels of said input image for which holds that the spatial resolution value is larger than the predefined threshold SR pixels/meter corresponding to an object in the input image to be privacy protected to obtain a corresponding region of pixels having a spatial resolution value less than 100 pixels/meter to protect privacy information related to human faces and less than 50 pixels/meter to protect privacy information related to license plates in an output image.

2. The method according to claim 1, wherein the processing a region of pixels for which holds that the spatial resolution value is larger than the predefined threshold SR pixels/meter comprises:
determining a transformation function having a transformation window for pixel p(x,y) from the spatial resolution values associated with the region of pixels; and
performing the transformation function for pixel p(x,y) to obtain a color value for pixel p(x,y) in the output image.

3. The method according to claim 2, wherein the transformation function obtains the color value for pixel p(x,y) by calculating an average color value c from pixels of the input image associated with the transformation window.

4. The method according to claim 2, wherein the centre pixel of the transformation window coincides the pixel p(x,y) in the input image to determine the color value for pixel p(x,y) in the output image.

5. The method according to claim 1, wherein the processing a region of pixels for which holds that the spatial resolution value is larger than the predefined threshold SR pixels/meter comprises:
determining first regions of pixels having a spatial resolution value falling in a first predetermined range; and
performing an image processing operation on said first regions of pixels to obtain pixels values of the output image, wherein the image processing operation corresponds to subsequently down-sampling and up-sampling the first regions of pixels having said spatial resolution with a factor associated with said first predetermined range.

6. The method according to claim 1, wherein the method further comprises determining regions of interest which do not comprise privacy information, and wherein the processing action is adapted to exclude the pixels associated with said regions of interest from processing.

7. The method according to claim 1, wherein the method further comprises: determining a height of a group of pixels above the earth surface; and wherein the processing a group of pixels is arranged to reduce the spatial resolution of the group of pixels in dependence of the determined height.

8. A computer implemented system for reducing the spatial resolution of images, the system comprising:
a processor; and
memory connected to the processor, the memory comprising a computer program comprising data and instructions arranged, when executed, to allow said processor to:
acquire an input image comprising image parts having a spatial resolution larger than a predefined threshold SR pixels/meter, wherein the spatial resolution is associated with a clarity of an image;
acquire a depth map associated with said input image;
determine for each pixel p(x,y) a spatial resolution value by means of the depth map; and
process a region of pixels of said input image for which holds that the spatial resolution value is larger than the predefined threshold SR pixels/meter corresponding to an object in the input image to be privacy protected to obtain a corresponding region of pixels having a spatial resolution value less than 100 pixels/meter to protect privacy information related to human faces and less than 50 pixels/meter to protect privacy information related to license plates in an output image.

9. A computer program product for use in a data processing system, for reducing the spatial resolution of images, the computer program product comprising a non-transitory computer readable medium storing instructions, which when executed, allows a processor to:
acquire an input image comprising image parts having a spatial resolution larger than a predefined threshold SR pixels/meter, wherein the spatial resolution is associated with a clarity of an image;
acquire a depth map associated with said input image;
determine for each pixel p(x,y) a spatial resolution value by means of the depth map; and
process a region of pixels of said input image for which holds that the spatial resolution value is larger than the predefined threshold SR pixels/meter corresponding to an object in the input image to be privacy protected to obtain a corresponding region of pixels having a spatial resolution value less than 100 pixels/meter to protect privacy information related to human faces and less than 50 pixels/meter to protect privacy information related to license plates in an output image.

* * * * *